(12) United States Patent
Tiramani et al.

(10) Patent No.: US 6,213,328 B1
(45) Date of Patent: Apr. 10, 2001

(54) METHOD AND CONSTRUCTION FOR CONNECTING TOGETHER METAL AND PLASTIC ELEMENTS

(75) Inventors: Paolo M. B. Tiramani, Greenwich; Soohyun Ham, Stamford; Chester M. Fudge, Middletown; John A. Bozak, Greenwich, all of CT (US)

(73) Assignee: 500 Group Inc., Greenwich, CT (US)

( * ) Notice: Subject to any disclaimer, the term of this patent is extended or adjusted under 35 U.S.C. 154(b) by 0 days.

(21) Appl. No.: 09/224,103

(22) Filed: Dec. 31, 1998

(51) Int. Cl.[7] ................................................ B65D 6/28
(52) U.S. Cl. ........................ 220/4.28; 220/611; 403/251
(58) Field of Search ..................................... 220/611, 615, 220/617, 632, 634, 789, 790, 801, 802; 403/251, 252, 263, 329

(56) References Cited

U.S. PATENT DOCUMENTS

| | | |
|---|---|---|
| 2,761,188 | 9/1956 | Bedford, Jr. . |
| 2,817,132 | 12/1957 | Petri . |
| 3,771,834 | 11/1973 | Kretschmer . |
| 3,788,707 | 1/1974 | Connell . |
| 3,794,385 | 2/1974 | Kretschmer . |
| 3,873,161 | 3/1975 | Kretschmer . |
| 3,876,257 | 4/1975 | Buerger . |
| 3,934,385 | 1/1976 | Paulus et al. . |
| 3,970,346 | 7/1976 | Kretschmer . |
| 4,003,604 | 1/1977 | Connell . |
| 4,063,783 | 12/1977 | Spisak . |
| 4,093,312 | 6/1978 | Kretschmer . |
| 4,149,754 | 4/1979 | Beisch et al. . |
| 4,383,716 | 5/1983 | Osborn . |
| 4,542,569 | 9/1985 | Ladouceur . |
| 4,769,966 | 9/1988 | Petri . |
| 4,789,138 | 12/1988 | Acton . |
| 5,232,302 | 8/1993 | Wagner et al. . |
| 5,339,584 | 8/1994 | Ohtake et al. . |

FOREIGN PATENT DOCUMENTS 22 02 312   10/1973   (DE) .

*Primary Examiner*—Allan N. Shoap
*Assistant Examiner*—Joe Merek
(74) *Attorney, Agent, or Firm*—Morgan, Lewis & Bockius LLP

(57) ABSTRACT

A metal element which includes a surface, a first end portion and an opposite, second, end portion, the first end portion being formed with a plurality of inner cuts designed so as to enable a plurality of pieces each remaining integrally connected to the metal element to at least slightly protrude from the surface, each of the pieces featuring at least one sharp or pointed edge generally pointing towards the opposite, second end portion.

35 Claims, 17 Drawing Sheets

METHOD AND CONSTRUCTION FOR CONNECTING TOGETHER METAL AND PLASTIC ELEMENTS

FIELD AND BACKGROUND OF THE INVENTION

The present invention relates to the art of connecting elements made of different materials, typically softer and harder materials, and, more particularly, to a method and construction effective in connecting together metal and plastic elements.

In many cases it is advantageous in terms of stability, durability, appearance, weight, production costs, storage costs, shipping costs, and the like to stably and non-separably connect plastic and metal elements together.

The prior art teaches, in this respect, the use of a plurality of nits or screws inserted into dedicated holes pre prepared in the plastic and/or metal elements to thereby connect them together.

This approach is disadvantageous because the process of connecting the two elements is tedious and cumbersome, since each nit or screw needs individual attention.

There is thus a widely recognized need for, and it would be highly advantageous to have, a novel and simpler way of connecting together metal and plastic elements.

SUMMARY OF THE INVENTION

According to one aspect of the present invention there is provided a metal element comprising a surface, a first end portion and an opposite, second, end portion, the first end portion being formed with a plurality of inner cuts designed so as to enable a plurality of pieces each remaining integrally connected to the metal element to at least slightly protrude from the surface, each of the pieces featuring at least one sharp or pointed edge generally pointing towards the opposite, second, end portion.

According to another aspect of the present invention there is provided a method of engaging together in a stable, substantially non-separable, manner at least one plastic element and at least one metal element having a surface and an end portion, the method comprising the steps of (a) forming an accepting groove having an opening in the at least one plastic element; (b) forming at least one inner cut designed so as to enable at least one piece remaining integrally connected to the metal element to at least slightly protrude from the surface thereof, the at least one piece featuring at least one sharp or pointed edge generally pointing towards the opening of the accepting groove, such that the end portion of the at least one metal element is readily insertable into the accepting groove of the at least one plastic element; and (c) inserting the end portion of the at least one metal element into the accepting groove of the at least one plastic element via the opening, so as to enable the at least one piece to secure the end portion in the accepting groove, so as to resist separation of the at least one plastic element and the at least one metal element.

According to yet another aspect of the present invention there is provided an article of manufacture comprising at least one plastic element formed with an accepting groove having an opening and at least one metal element having a surface and an end portion being intimately accepted in the accepting groove, the end portion of the at least one metal element being formed with at least one inner cut designed so as to enable at least one piece remaining integrally connected to the metal element to at least slightly protrude from the surface, the at least one piece featuring at least one sharp or pointed edge generally pointing towards the opening of the accepting groove, such that the end portion of the at least one metal element is readily insertable into the accepting groove of the at least one plastic element, while the at least one piece secures the end portion in the accepting groove, so as to resist separation of the at least one plastic element and the at least one metal element.

According to further features in preferred embodiments of the invention described below, the at least one piece is U or V shaped.

According to still further features in the described preferred embodiments the at least one piece is formed through a combination of the inner cut and a cutout.

According to still further features in the described preferred embodiments the cutout is substantially circular having a first radius, and the inner cut is an incomplete circular form having a second radius, larger than the first radius, such that the at lest one piece features a double horn configuration.

According to still further features in the described preferred embodiments the at least one metal element features ribs.

According to still further features in the described preferred embodiments the end portion of the at least one metal element is bent.

According to still further features in the described preferred embodiments the bend is of about 90 degrees.

According to still further features in the described preferred embodiments the at least one metal elements, alone or in combination with additional metal elements, form an enclosure selected from the group consisting of a substantially circular enclosure and a substantially circular enclosure.

According to still further features in the described preferred embodiments the enclosure is selected from the group consisting of a single metal element bent to form the enclosure, and at least two metal elements bent to form the enclosure in combination.

According to still further features in the described preferred embodiments the at least two metal elements bent to form the enclosure in combination feature complementary engaging mechanisms for stabilizing the combination.

According to still further features in the described preferred embodiments the accepting groove of the at least one plastic element includes an undercut.

According to still further features in the described preferred embodiments the at least one plastic element and the at least one metal element are further connected to one another by at least one nit.

According to still further features in the described preferred embodiments the accepting groove of the at least one plastic elements is formed between walls of a cutout formed in the at least one plastic element an walls of an extra plastic piece inserted into the cutout and thereafter welded to the at least one plastic element.

According to still further features in the described preferred embodiments the article of manufacture is formed as a container having two bases made of plastic and four side walls made of metal.

According to still further features in the described preferred embodiments each of the bases includes a crossing rib structure.

According to still further features in the described preferred embodiments at least one of the bases is formed with an opening.

According to still further features in the described preferred embodiments at least one of the bases is formed with a portion of a hinge mechanism for holding an openable cover having a compatible portion of the hinge mechanism.

According to still further features in the described preferred embodiments the openable cover is decorated with direction alternating quatrogons, so as to mimic appearance of metal articles.

According to still further features in the described preferred embodiments the container features a wheel and a locking mechanism.

According to still further features in the described preferred embodiments the article of manufacture is formed as a construct having two sides made of plastic and at least one metal member connected therebetween.

According to still further features in the described preferred embodiments the construct is selected from the consisting of a drawer, a door, a chair, a bin, a mail box, a ladder, a bench and a shelf.

The present invention successfully addresses the shortcomings of the presently known configurations by providing a a method and construction effective in connecting together metal and plastic elements which is simpland easy to implement, and above all, overcomes the limitations of the prior art.

BRIEF DESCRIPTION OF THE DRAWINGS

The invention herein described, by way of example only, with reference to the accompanying drawings, wherein.

DESCRIPTION OF THE PREFERRED EMBODIMENTS

Figure 1:
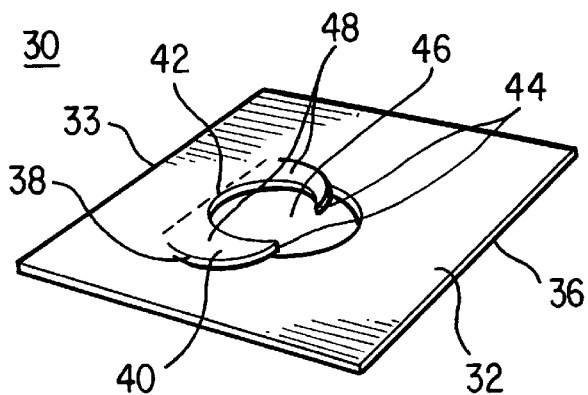
FIGS. 1–3 are simplified perspective views of metal elements according to the present invention featuring inner cuts at an end portion thereof, facing the other end portion thereof.

The present invention is of a method and construction effective in connecting together metal and plastic elements which can be used to manufacture combined and easy to assemble metal-plastic articles. Specifically, the present invention can be used to manufacture articles such as, but not limited to, drawers, doors, chairs, bins, mail boxes, ladders, benches, shelves, containers and the like.

The principles and operation of a method and construction according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 2:
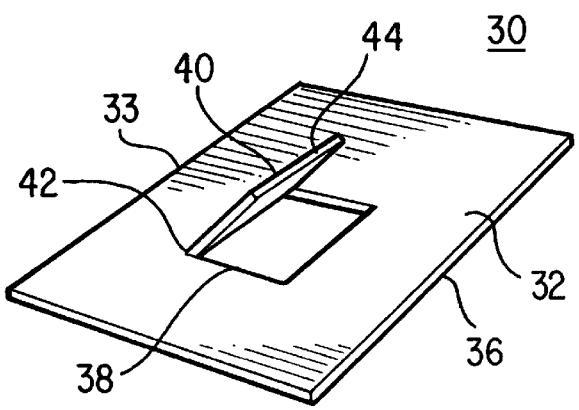
Figure 3:
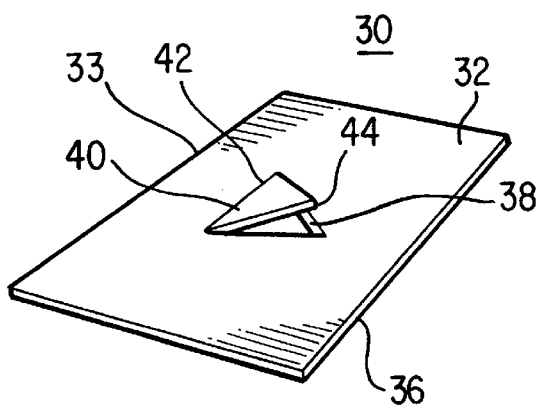
Figure 4:
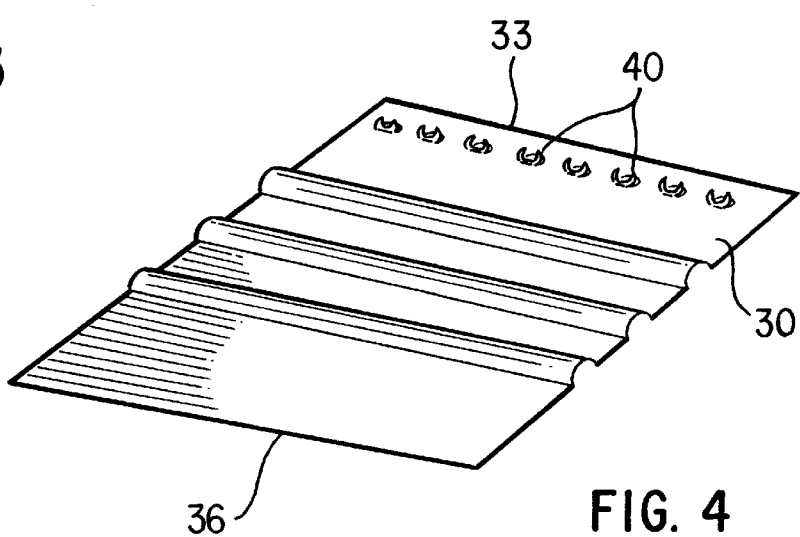
FIGS. 4–13 are simplified perspective views of metal elements according to the present invention featuring ribs.
Figure 5:
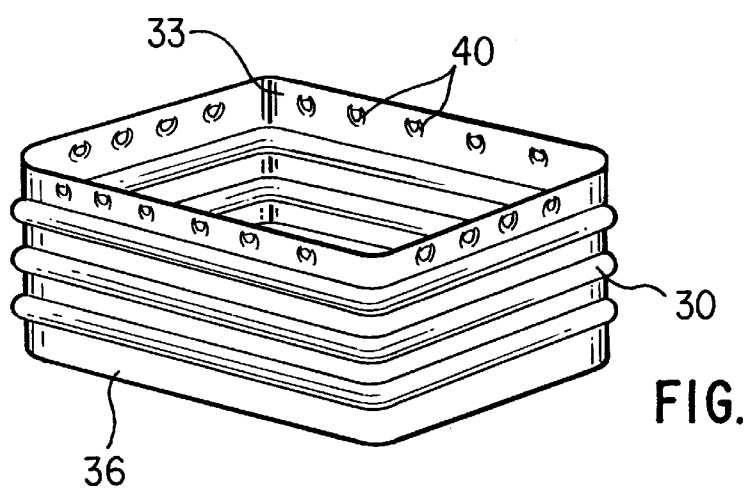
Figure 6:
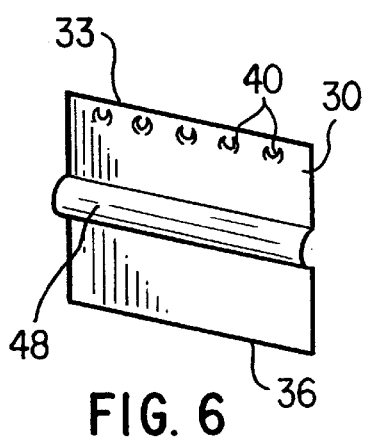
Figure 7:
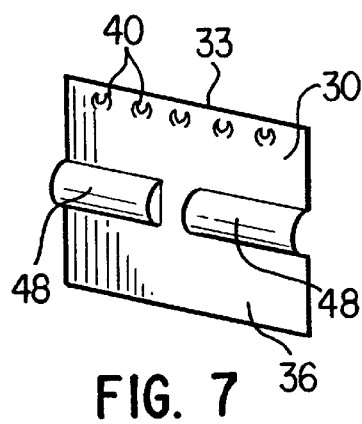
Figure 8:
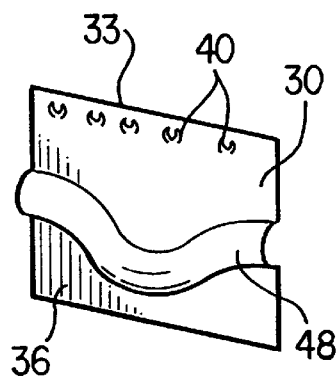
Figure 9:
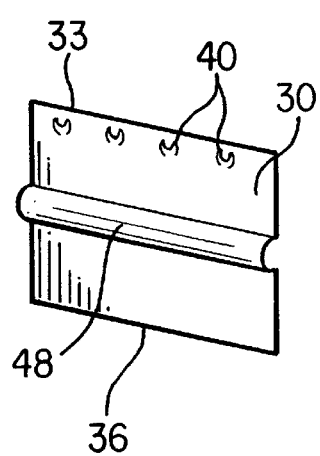
Figure 10:
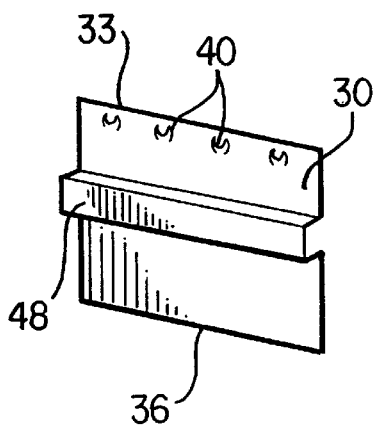
Figure 11:
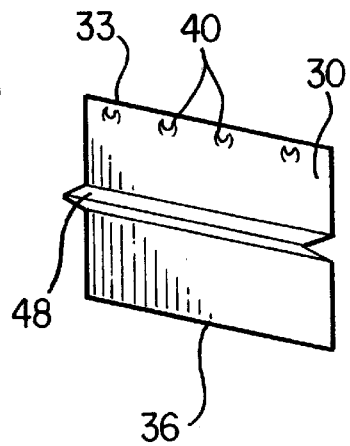
Figure 12:
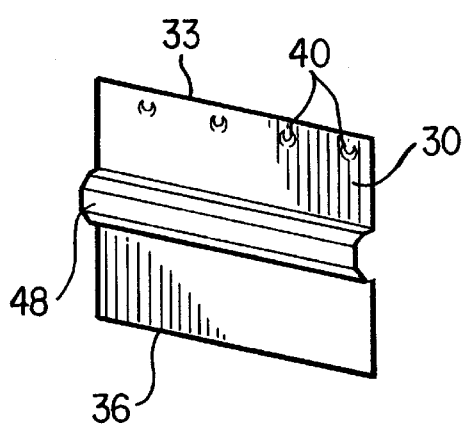

Referring now to the drawings, FIGS. 1–3 illustrate three examples of the most important feature according to the present invention. Shown is a metal element 30 having a surface 32, a first end portion 33 and an opposite, second, end portion 36. First end portion 33 is formed with at least one, preferably a plurality (one is shown), of inner cuts 38 designed so as to enable a plurality of pieces 40, each remaining integrally connected to metal element 30 via a base-stem, as indicated by 42, to at least slightly protrude from surface 32. Each of pieces 40 features, according to the present invention, at least one sharp or pointed edge or end 44 (collectively referred to in the claims as "sharp or pointed edge"), generally pointing towards opposite, second end portion 36.

According to a preferred embodiment of the present invention, and as specifically shown in FIGS. 2 and 3, pieces 40 feature a U or a V shape, respectively, thus partly remaining connected to element 30 via base-stem 42.

According to a presently most preferred embodiment of the present invention, and as specifically shown in FIG. 1, pieces 40 are formed through a combination of inner cut 38 and a cutout 46.

In the example shown, cutout 46 is substantially circular and has a first radius, and inner cut 38 has an incomplete circular form and a second radius, larger than the first radius, such that each of pieces 40 features a double horn configuration 48.

In any case, according to a preferred embodiment of the present invention, pieces 40 are formed by, what is known in the art as "a punching die" adapted at forming any desired design for pieces 40.

As shown in FIGS. 4–13, according to another preferred embodiment of the present invention metal element 30 features ribs 48. Ribs 48 are formed generally in parallel to end portions 33 and 36. Ribs 48 can be continuous, crossing element 30 from side to side or concentrically, as shown in FIGS. 4, 6 and 8–18 and 5, respectively, or, alternatively, as specifically shown in FIG. 7, ribs 48 can be discontinuous.

Figure 13:
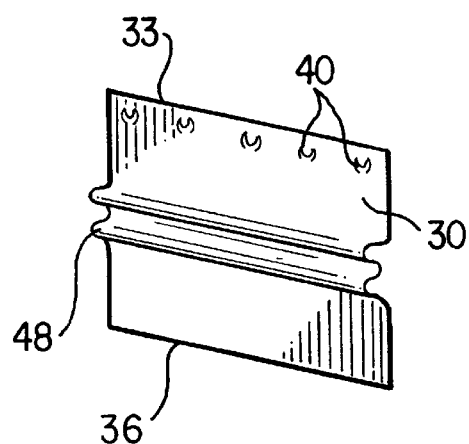
Figure 14:
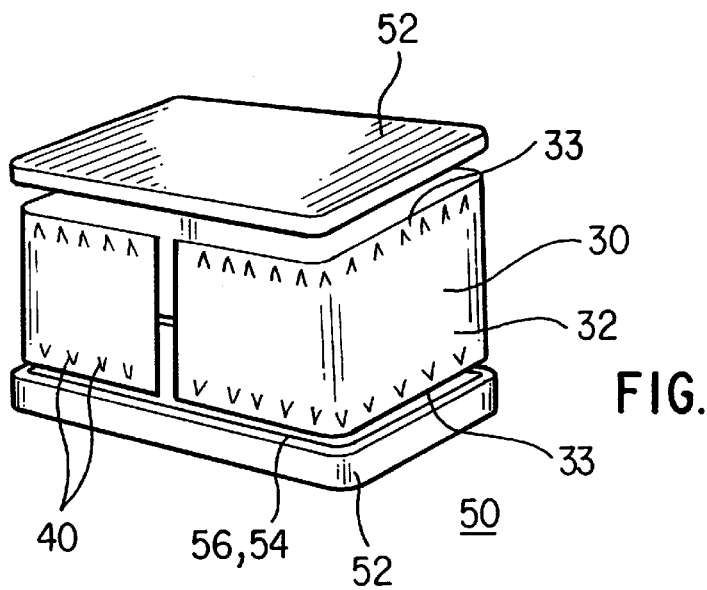
FIGS. 14–22 show several articles of manufacture manufactured in accordance with the teachings of the present invention.
Figure 15:
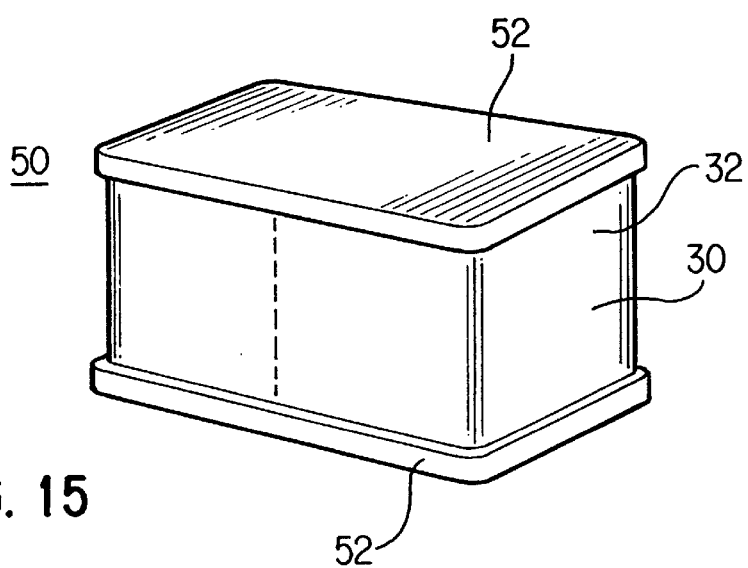
Figure 16:
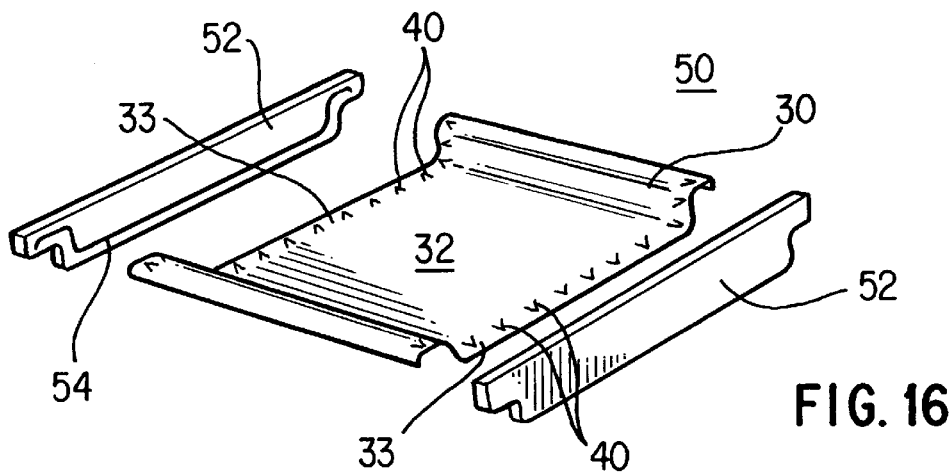
Figure 17:
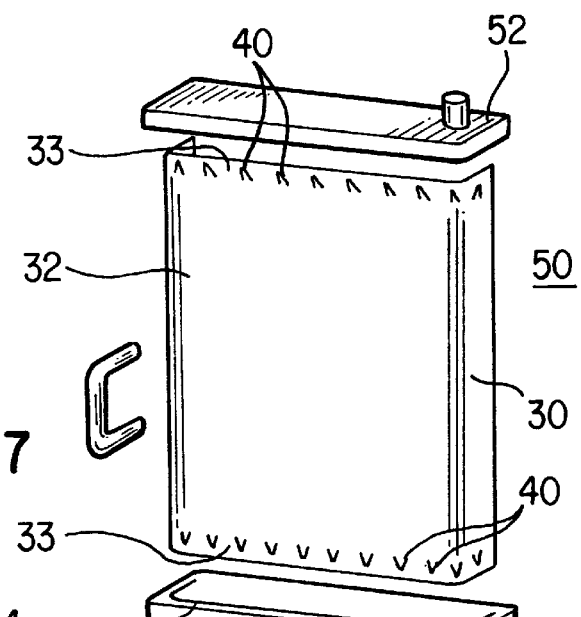
Figure 18:
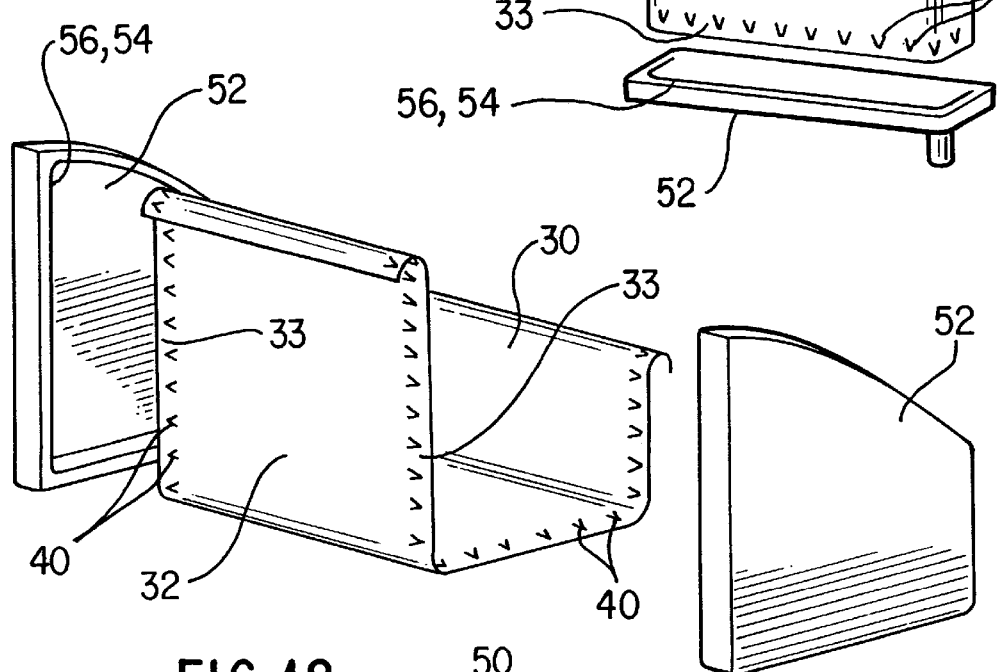
Figure 19:
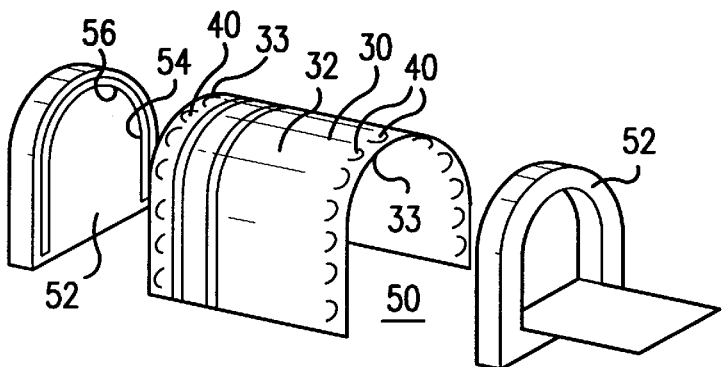
Figure 20:
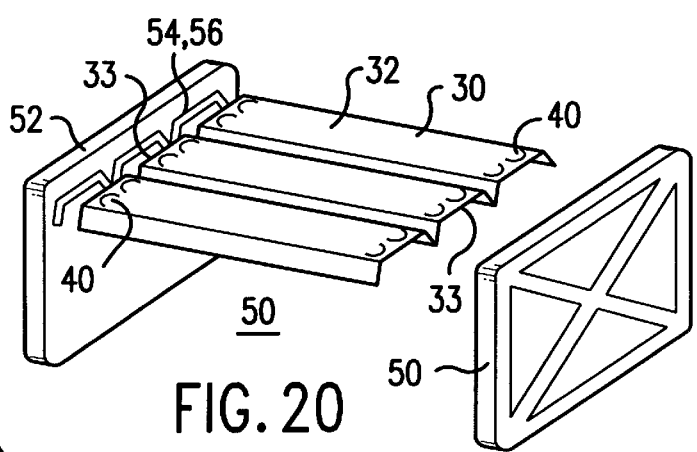
Figure 21:
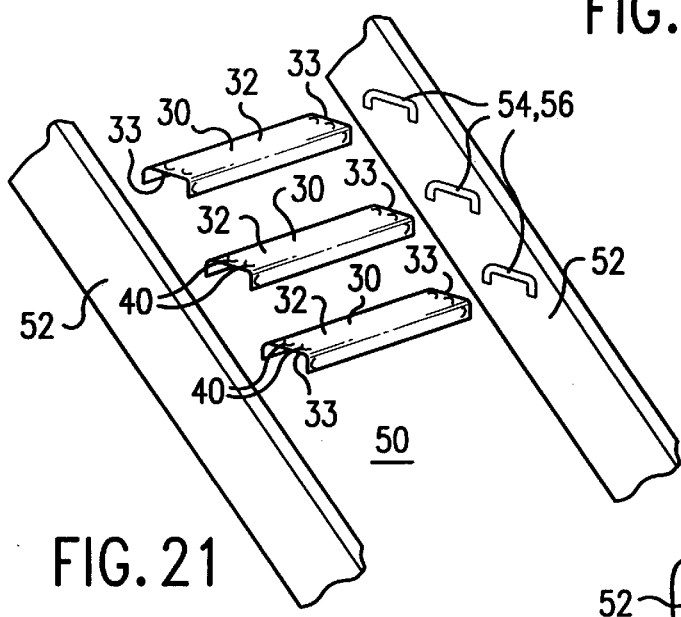

In any case, ribs 48 can have any desired cross section, such as, but not limited to, a U cross section, a V cross section, a curved cross section, a polygonal cross section, or accordion like cross section, the latter is specifically shown in FIG. 13. However, other designs are also envisaged. In any case, as well known in the art, ribs 48 serve for providing metal element 30 with extra strength and bent-resistance.

FIGS. 14–22 show articles of manufacture 50 manufactured in accordance with the teachings and the gist of the present invention as herein described. Each of articles 50 includes at least one plastic element 52 (typically two are provided), each is formed with an accepting groove 54 (or several, FIG. 21) having an opening 56. Each of articles 50 further includes at least one metal element 30 having a surface 32 and at least one end portion 33 (typically two end portions 33 are employed). End portions 33 are intimately accepted in their corresponding accepting grooves 34. End portions 33 are formed with at least one, preferably, as shown, a plurality of inner cuts designed so as to enable a plurality of pieces 40 remaining integrally connected to metal element 30 to at least slightly protrude from surface 32. Each of pieces 40 feature at least one sharp or pointed edge generally pointing towards opening 56 of accepting groove 54 (when article 50 is assembled), such that end portions 33 of metal elements 30 are readily insertable into their respective accepting grooves 34 of plastic elements 52, while pieces 40 secure end portions 33 in their respective accepting grooves 34, so as to resist separation of plastic elements 52 and metal elements 30.

Figure 22:
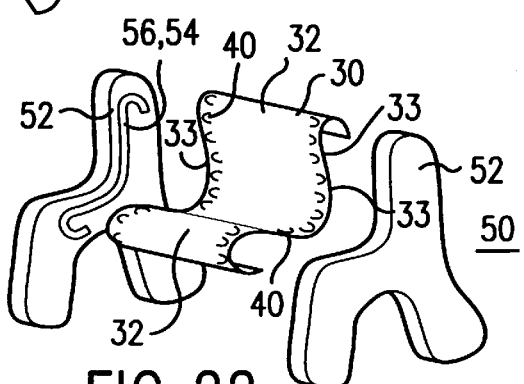
Figure 25:
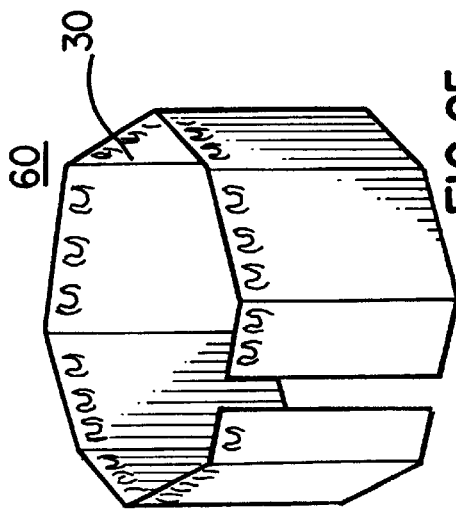
FIGS. 23–31 show several enclosures in a partially assembled and disassembled stacked arrangements.
Figure 28:
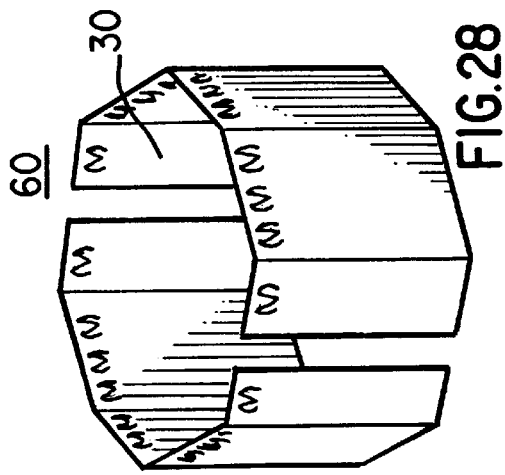
Figure 24:
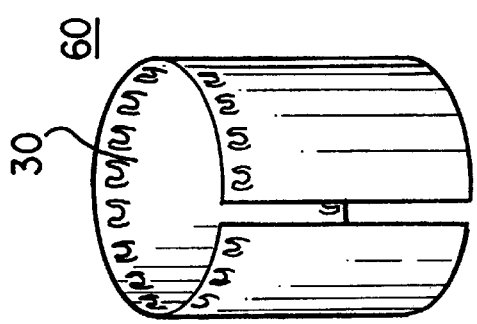
Figure 27:
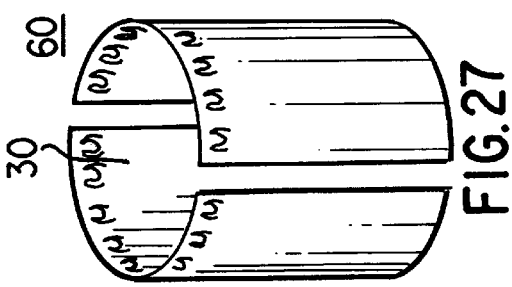
Figure 23:
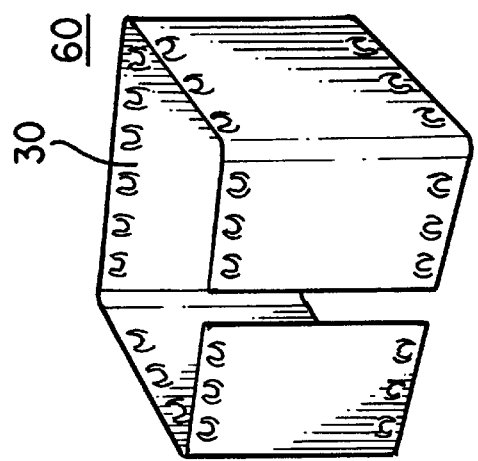
Figure 26:
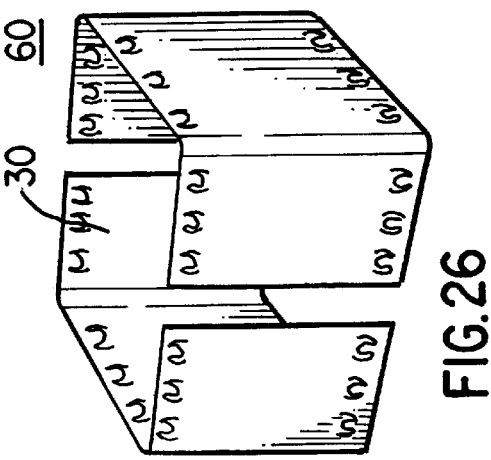

Article 50 can acquire any configuration, including, but not limited to, a container (FIGS. 14–15), a drawer (FIG. 16), a door (FIG. 17), a bin (FIG. 18), a mail box (FIG. 19), a shelf (FIG. 20) a ladder (FIG. 21) or a chair or bench (FIG. 22).

As shown in FIGS. 23–28, according to a preferred embodiment of the present invention, at least one metal element 30, alone (FIGS. 23–25) or in combination with additional metal elements 30 (FIGS. 26–28), form an enclosure 60.

Figure 31:
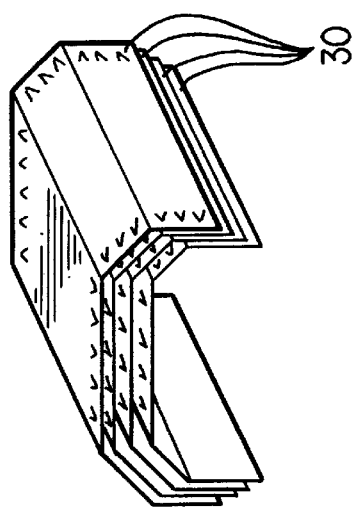
Figure 30:
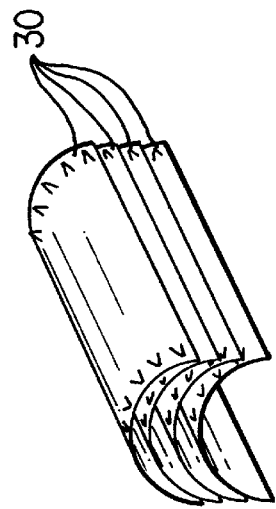
Figure 29:
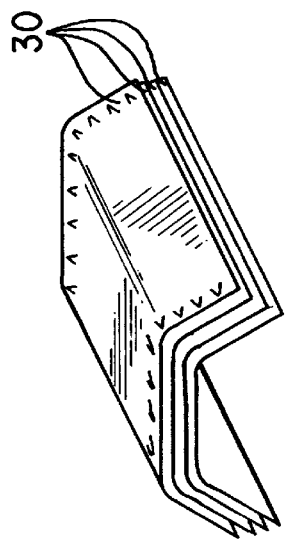
Figure 32:
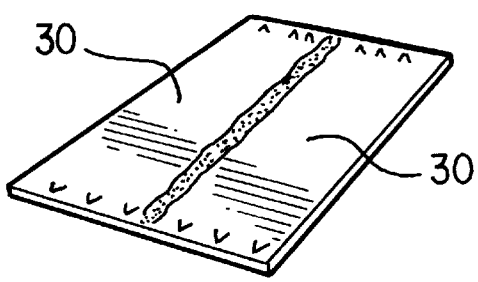
FIGS. 32–40 show some embodiments of connecting metal elements according to the present invention along their sides.
Figure 33:
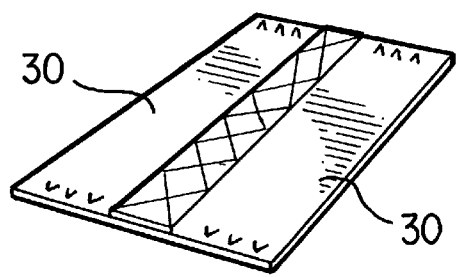
Figure 34:
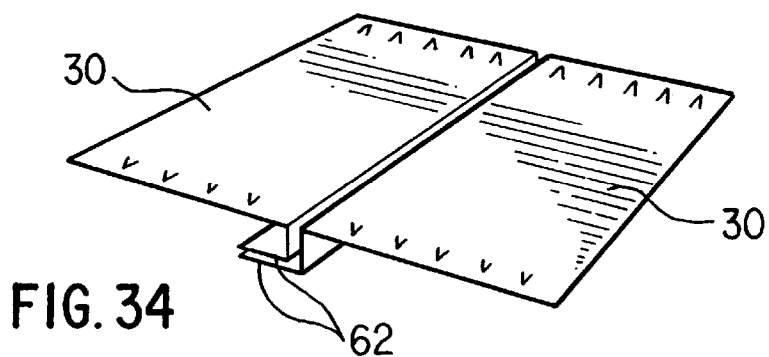
Figure 35:
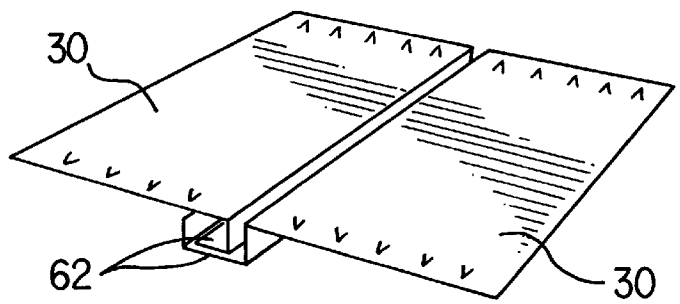
Figure 36:
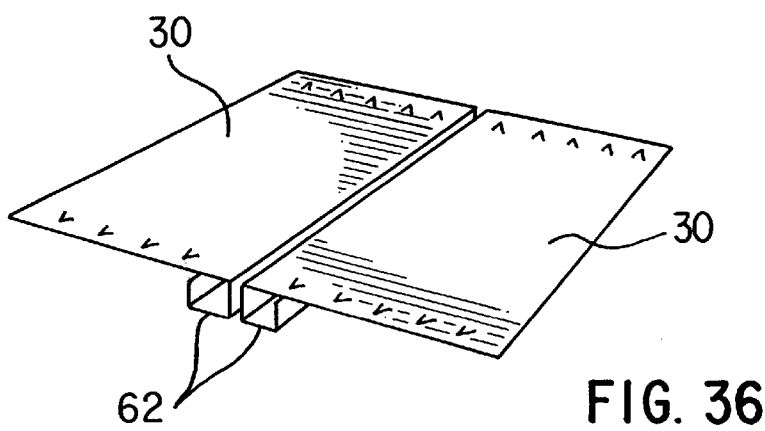
Figure 37:
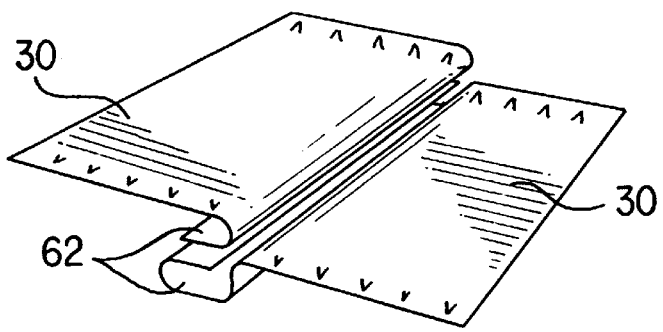
Figure 38:
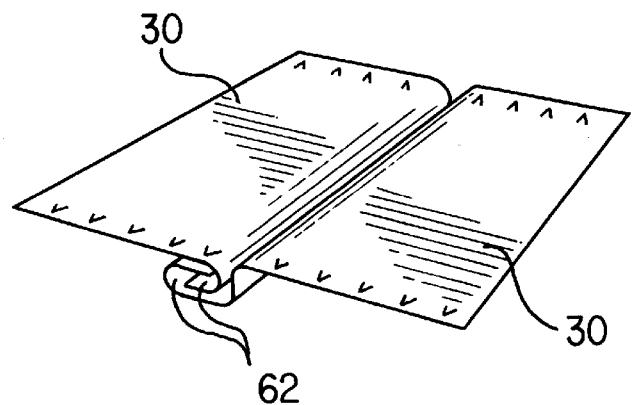
Figure 39:
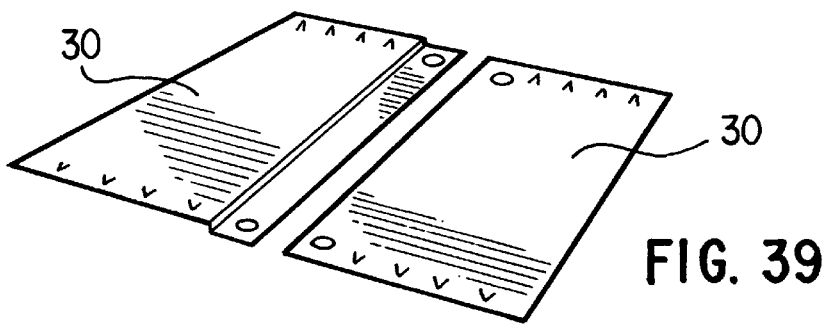
Figure 40:
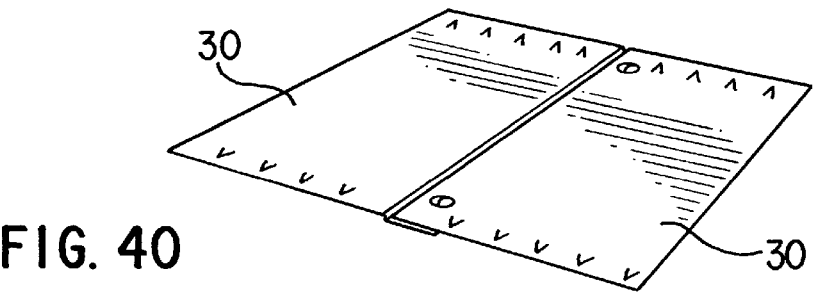
Figure 43:
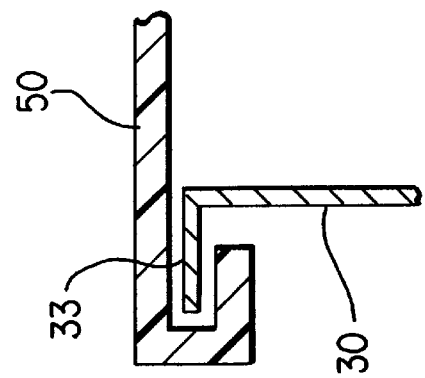
FIGS. 41–49 show various options for the geometry of the accepting groove of the plastic element and of the end portion of the metal element according to the present invention.
Figure 42:
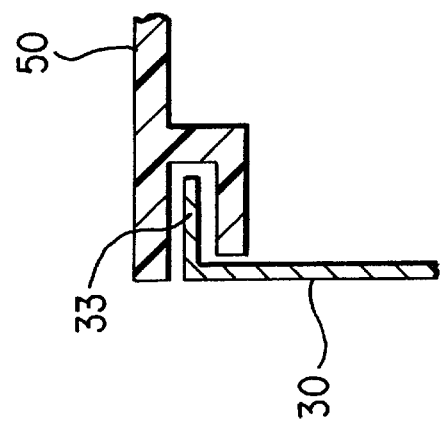

Enclosure 60 can be of a substantially circular form (FIGS. 24 and 27) or of a substantially polygonal form (FIGS. 23, 25, 26 and 28). As shown in FIGS. 29–31, enclosures made of a combination of at least two metal elements 30 are presently preferred, since such metal elements 30 can be stacked or pilled together, thereby save room and reduce shipment/packaging costs.

As shown in FIGS. 32–40, according to a preferred embodiment of the present invention, whenever two metal elements 30 are placed next to one another in an article of manufacture, the sides thereof are connected therebetween to provide extra strength and stability to the article when assembled.

As shown in FIGS. 32, 33 and 39–40, connecting elements 30 therebetween can be effected by welding and/or gluing, respectively. However, according to a presently preferred embodiment, connecting elements 30 is effected by providing elements 30 with complementary engaging mechanisms 62 along their connecting sides.

FIGS. 41–49 show various options for the geometry of accepting groove 54 of plaelement 50 and end portion 33 of metal element 30 formed with pieces 40 as described. It will be appreciated that grooves 54 are shown out of proportion for clearer demonstration, except for FIG. 47, wherein groove 54 intimately engages end portion 33, as is the real case.

Figure 41:
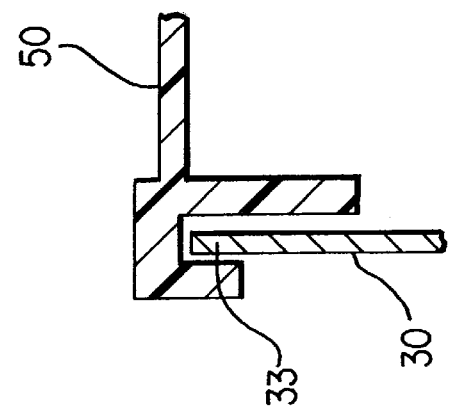

Thus, as shown in FIG. 41, for example, end portion 33 of metal element 30 can be in direct surface continuation to the rest of element 30.

Alternatively, as shown in FIGS. 42–49, end portion 33 of metal element 30 is bent, once (FIGS. 42–45), or twice (FIGS. 46–47), preferably, 90 degrees.

Figure 48:
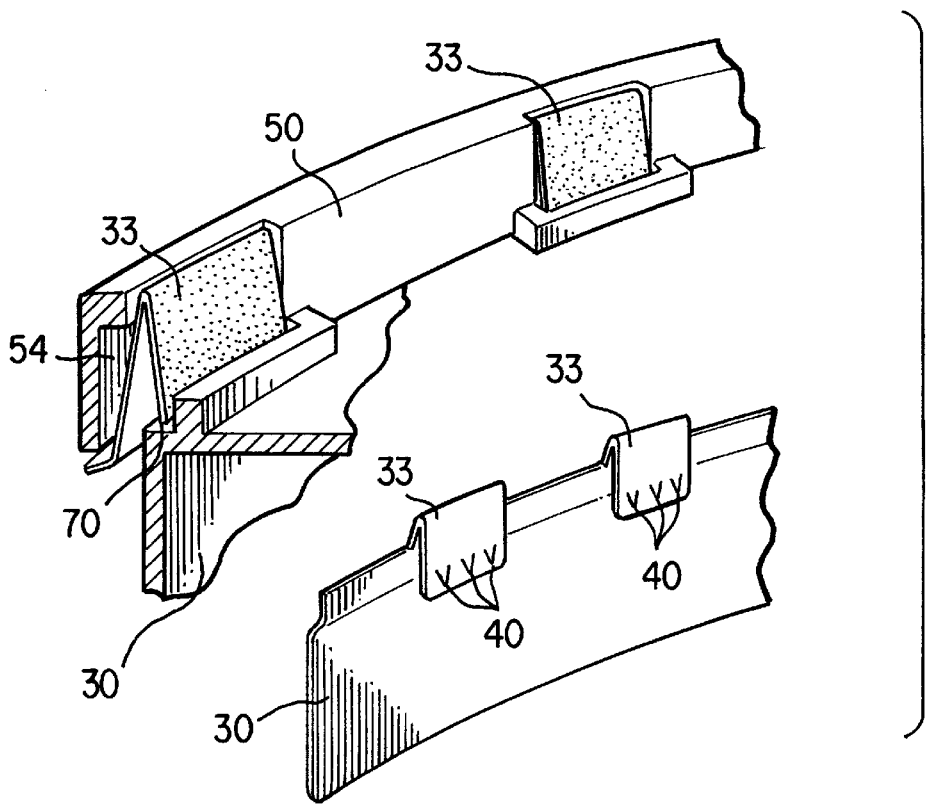
Figure 49:
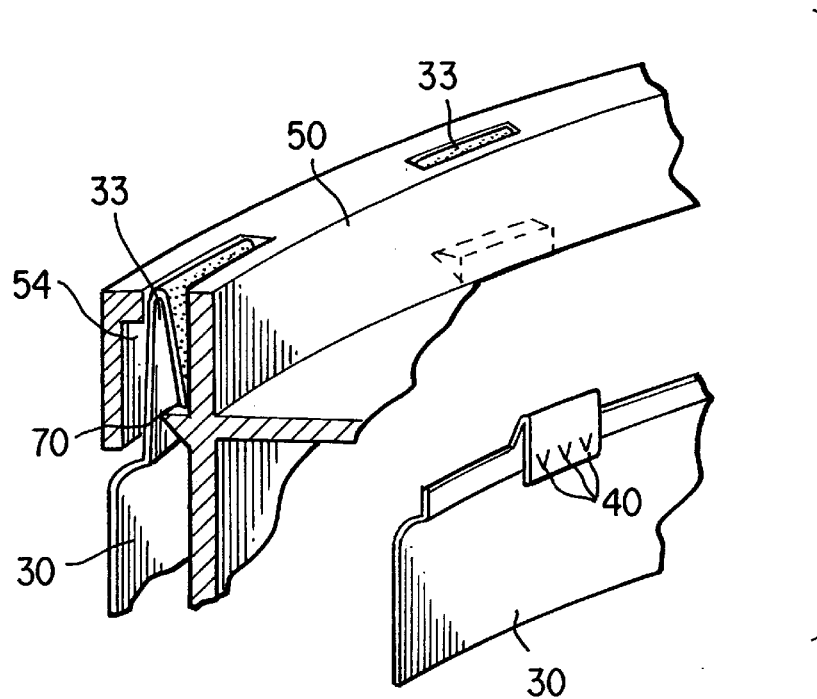

FIGS. 48–49 show accepting grooves 54 formed with an undercut 70.

Figure 44:
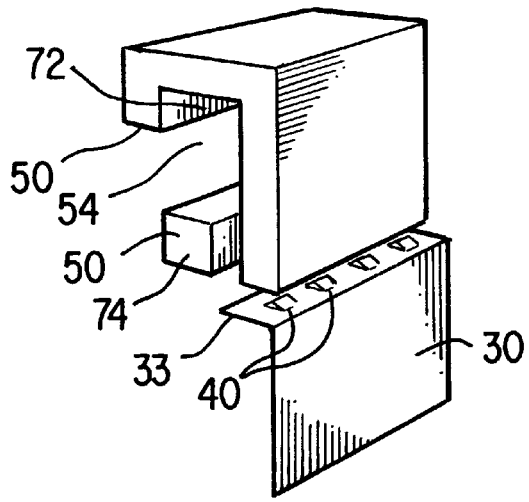
Figure 45:
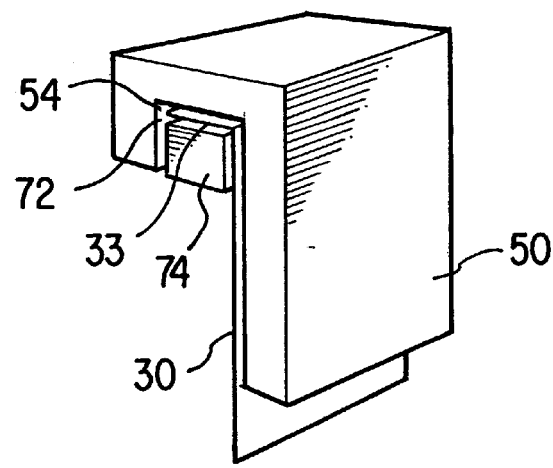
Figure 46:
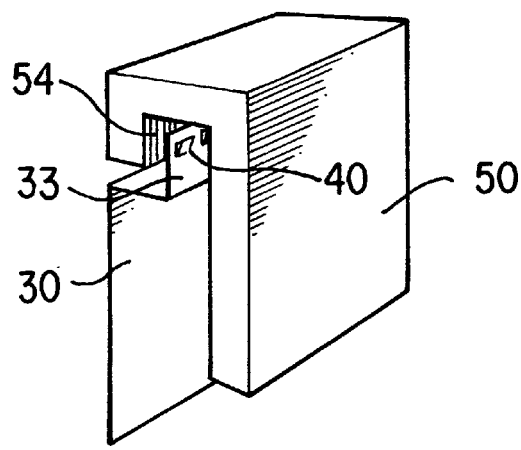
Figure 47:
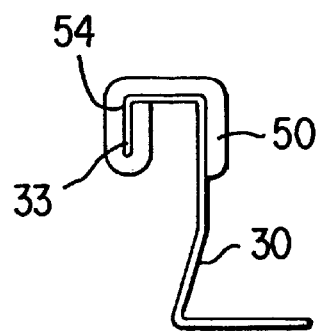

FIGS. 44–45 show a configuration wherein accepting groove 54 is formed between walls of a cutout 72 formed in plastic element 50 and walls of an extra plastic piece 74, inserted into cutout 72 and thereafter welded thereto.

Figure 50:
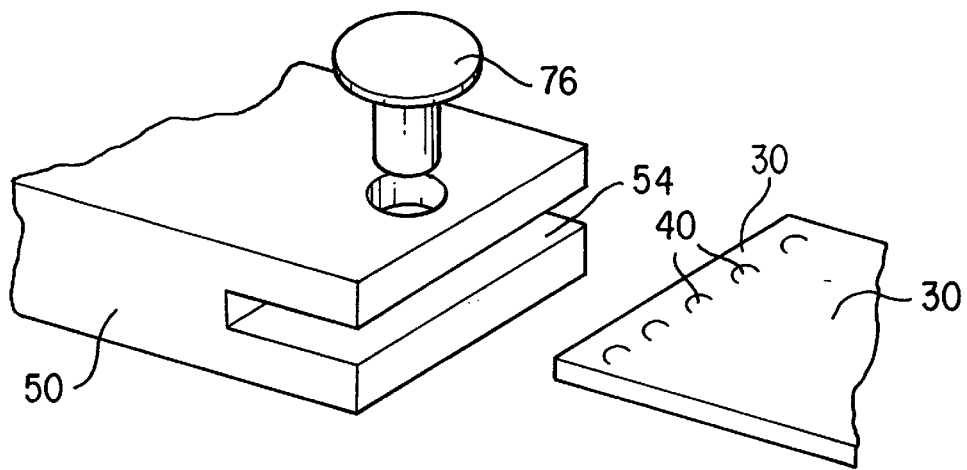
FIG. 50 shows an embodiment of the present invention, wherein a single nit serves to provide the connection between a metal element and a plastic element with extra strength.

As shown in FIG. 50, according to a preferred embodiment of the present invention, a single, or several nits 76, serve to provide the connection between metal element 30 and plastic element 50 with extra strength. Typically, a single nit is employed to prevent the beginning of a chain reaction, in which end portion 30 is torn out of groove 54, while breaking and/or back folding pieces 40 is experienced. While a nit accepting opening 78 is preferably pre-formed in plastic element 50, punching nit 76 through metal element 30 is envisaged.

Figure 51:
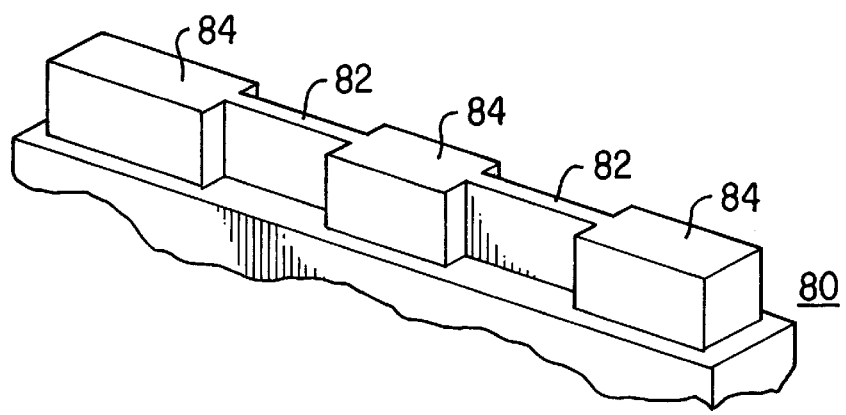
FIG. 51 shows an element which is used, according to a preferred embodiment of the present invention, in the manufacturing process of the plastic element to form the groove therein.

FIG. 51 shows an element 80 which is used, according to a preferred embodiment of the present invention, in the manufacturing process of plastic element 50 to form groove 54 therein.

Thus, element 80 is a long piece of typically metal including alternating thiner portions 82 and thicker portions 84, to thereby provide accepting groove 54 with narrow and wide portions, respectively. It will be appreciated that only the narrow portions formed in accepting groove 54 can serve for intimately holding end portions 33 of metal element 30 via pieces 40. The wide portions thereof can however serve to engage a thick connection region formed between adjacent metal elements 30, as shown in FIGS. 34–38. However, the main reason for element 80 relies in the manufacturing process of plastic element 50 via mold injection. Whereas narrow grooves in plastic components are difficult to mold due to the corresponding thin, free standing metal element used in the mold that forms such grooves, this free standing thin metal element is prone to failure in a number of different ways. First, it is readily bent when the mold is handled for maintenance. Second, it warp ages due to the continuous hot/cold cycling of the mold and the thinness of the metal element with respect to the rest of the mold, causing it to hold excessive heat. By interspersing thicker portions of metal in-between the thinner portions, a number of significant practical improvements are achieved. First, the thin portions are buttressed by the thick portions and are less likely to damage during mold maintenance. Second, the thin portions being supported by the thick portions are less likely to warp as they are physically supported by the thicker portions on both sides thereof. Third, the thicker portions act as heat sinks drawing off heat from the thin portions. Finally, the thick portions are sized, where necessary, to accept cooling rods for applying a cooling medium (e.g., water) to the mold.

Figure 52:
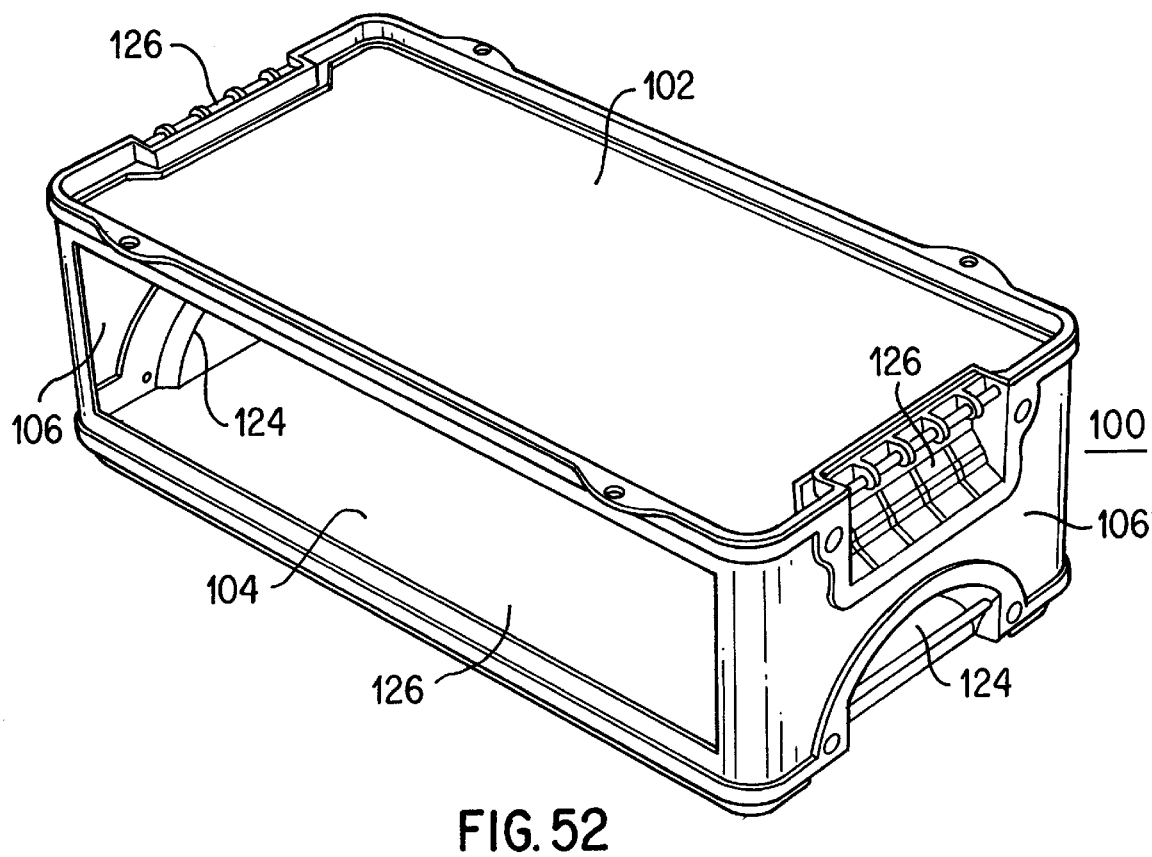

Shown in FIG. 52 is a container 100 according to the present invention, wherein, whenever metal in connected to plastic, the connection is effected as hereinabove described and is not further described herein, unless otherwise indicated.

Figure 54:
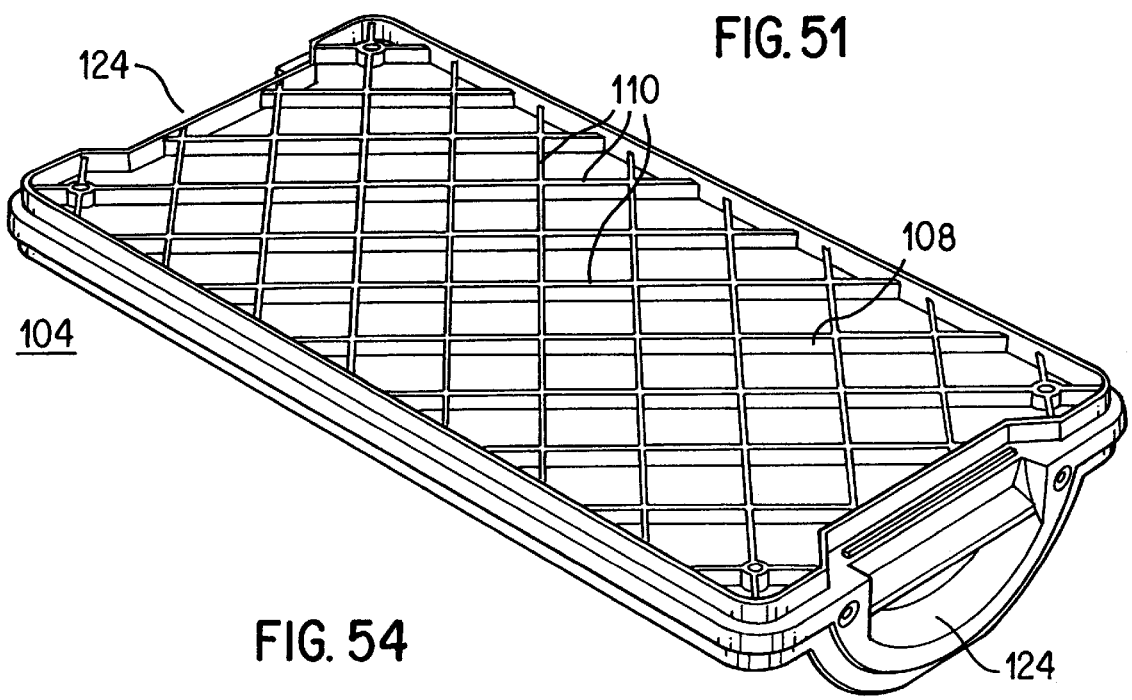
FIGS. 52–59 show containers and accessories thereof manufactured according to the present invention.
Figure 53:
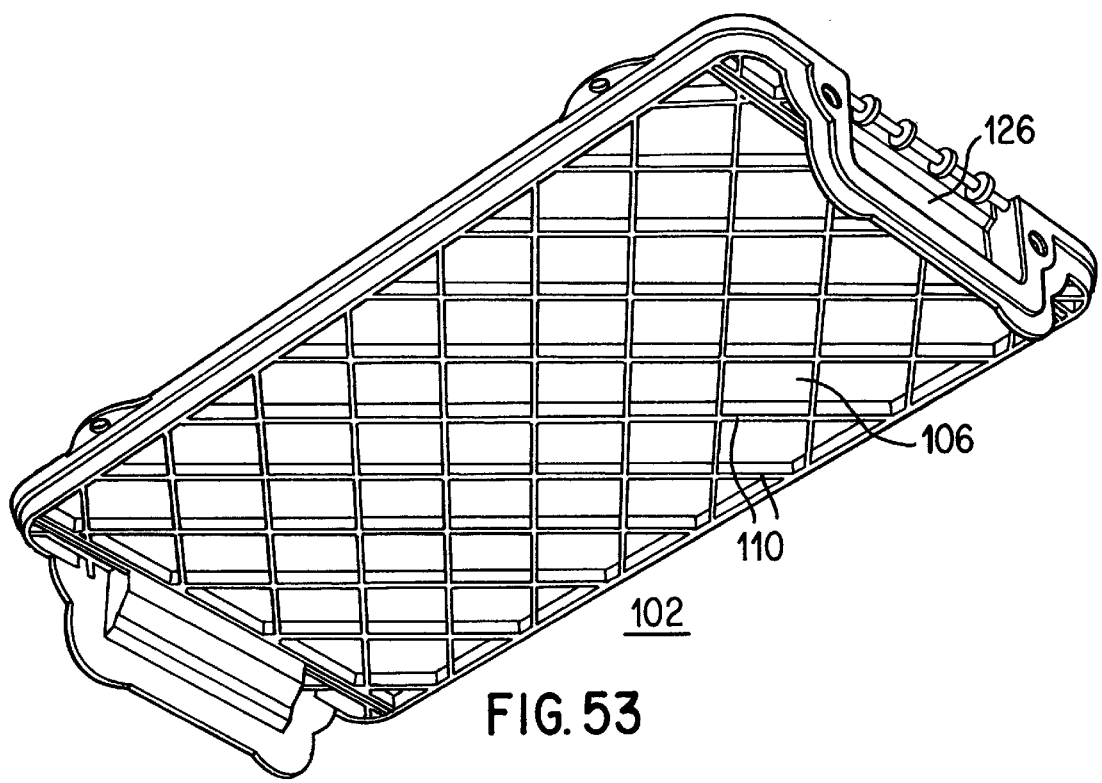

Container 100 has two bases 102 and 104, made of plastic, and four side walls 106 made of a single piece or several pieces of metal. Underside 106 of base 102 is shown in FIG. 53, whereas underside 108 of base 104 is shown in FIG. 54. Both undersides 106 and 108 are formed with 90 degrees crossing ribs 110, placed 45 degrees to the sides of their respective bases, for enduring extra strength and stability.

Figure 56:
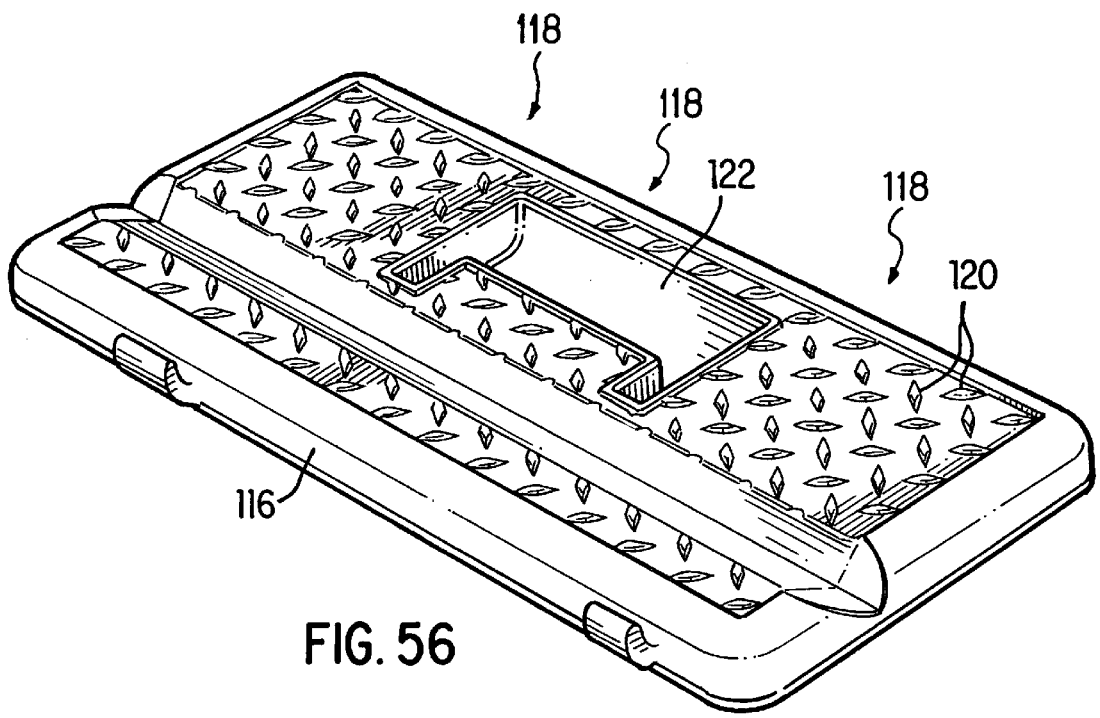
Figure 55:
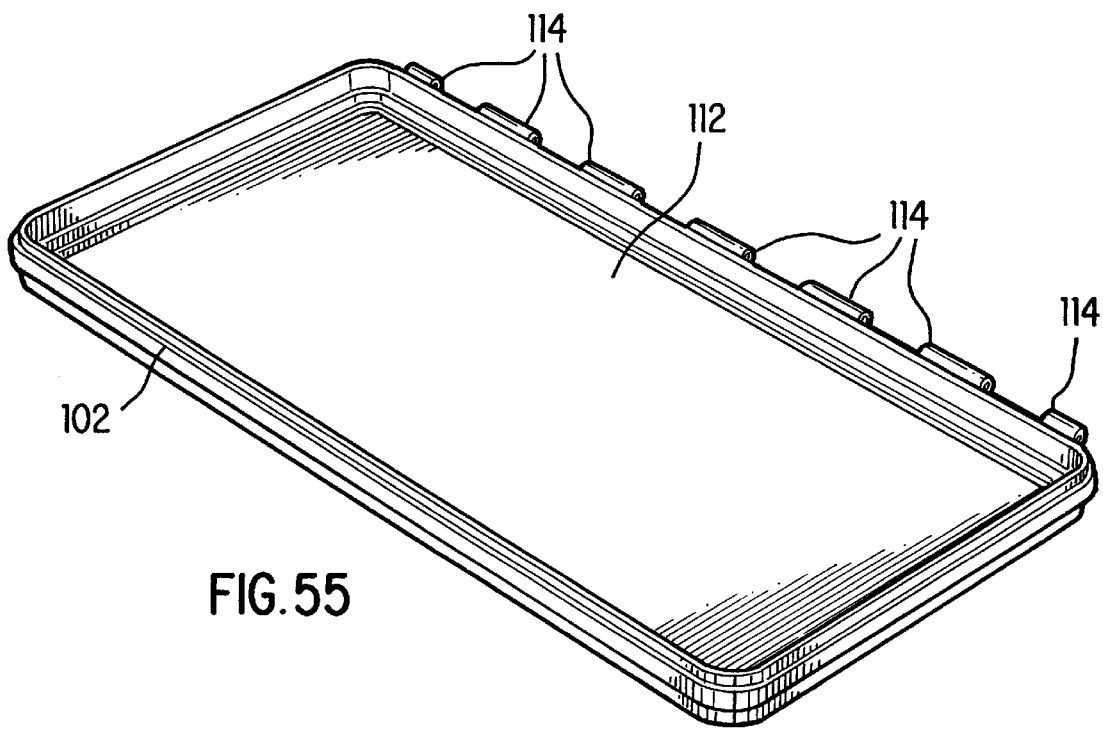
Figure 57:
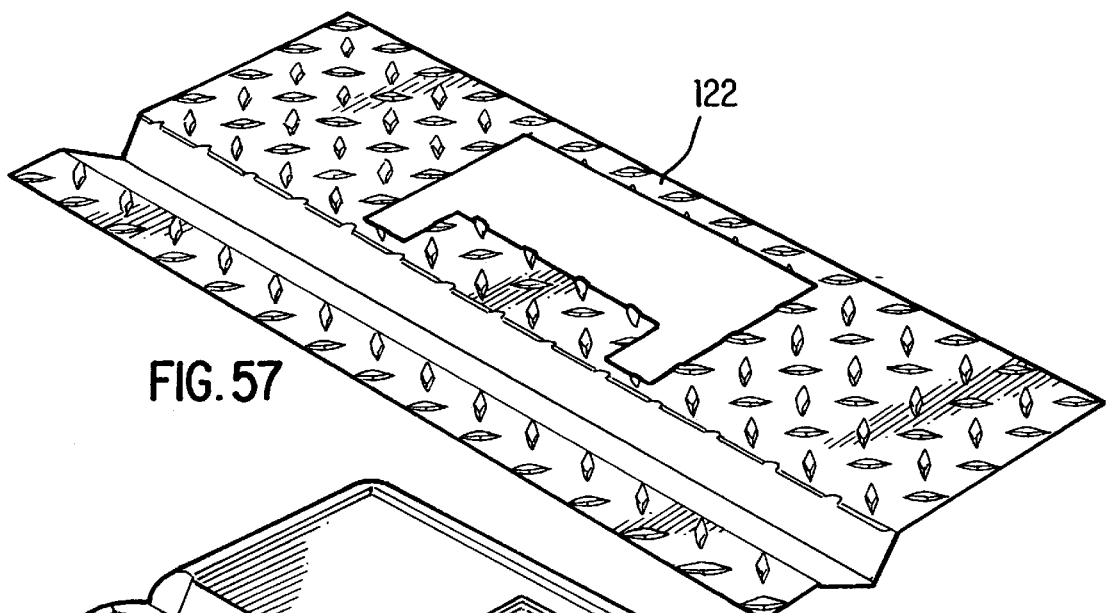
Figure 58:
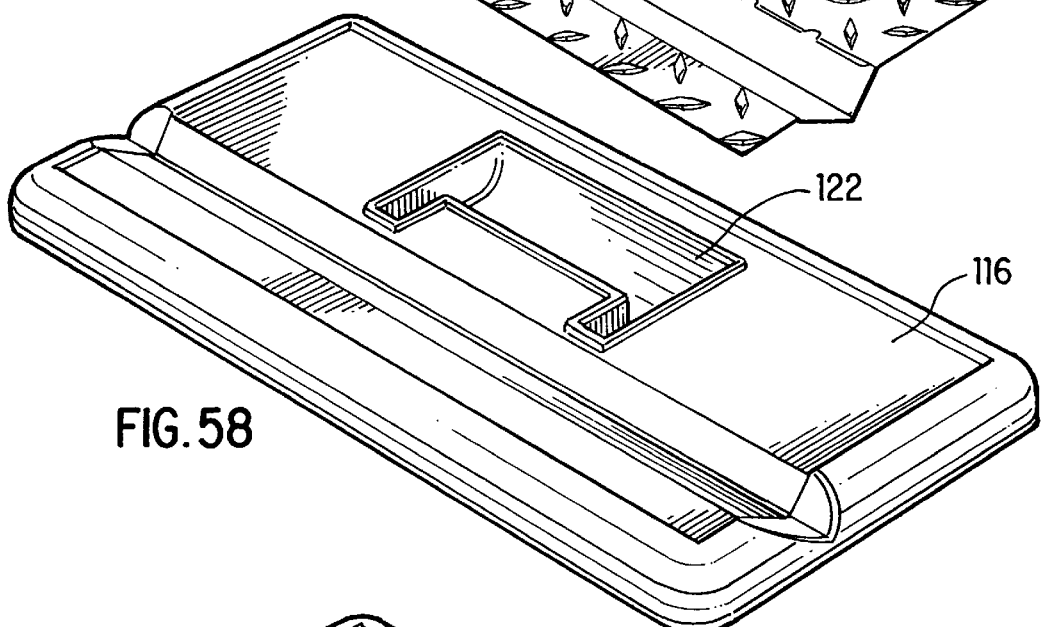
Figure 59:
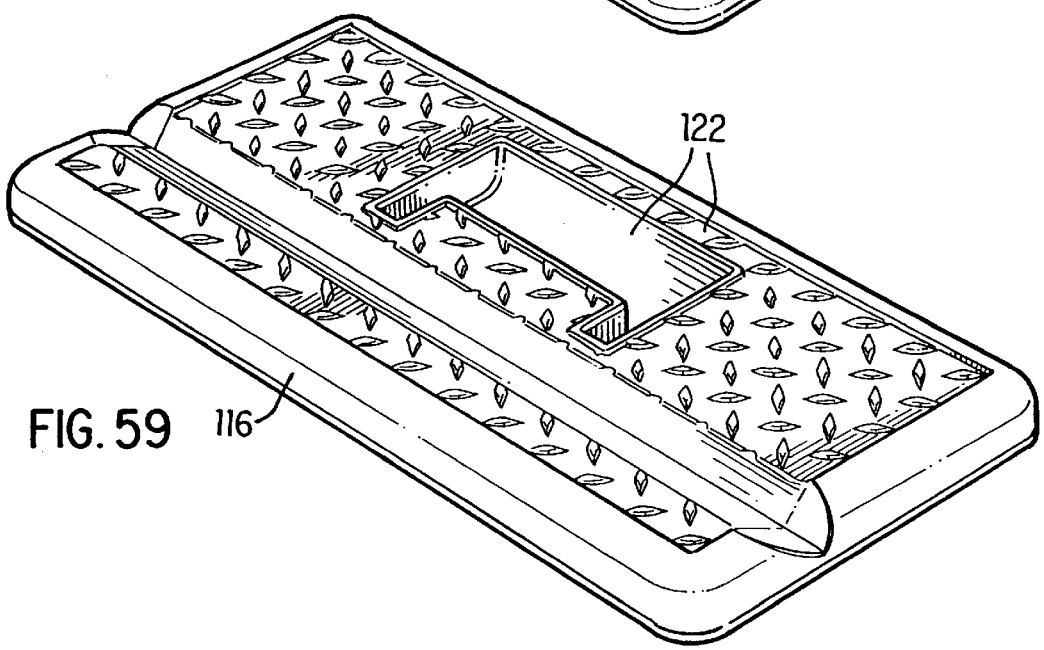

As shown in FIG. 55, one of the plastic bases, say base 102, can be formed with an opening 112 and further with a portion of a hinge mechanism 114 for holding an openable cover 116 (shown in FIG. 56) having a compatible portion of hinge mechanism 118, structurally similar to mechanism 112. Openable cover 116 is preferably decorated with direction alternating quatrogons 120, so as to mimic appearance of metal articles. Alternatively, as shown in FIGS. 57–58, it is covered (e.g., by gluing or nitting) with a thin metal plate 122. As shown in FIGS. 56, 58 and 59, openable cover 116 is formed with a handle accepting groove 122 for rotatably engaging a recessing handle therein. Container 100 can optionally include application for enabling application of any item thereto. For example, as shown in FIGS. 52 and 54, base 104 includes two recessions 124, whereas, as shown in FIGS. 52 and 53, base 102 includes two locking mechanisms 126 for engaging there-on-top and locking thereto additional containers 100 through recessions 124 (see also FIG. 59). As further shown in FIG. 52, an opening 126 can be opened in one of metal side walls 106. Opening 126 can serve for slidably or rotatably accepting a drawer or bin, respectively.

U.S. patent application Ser. No. 09/017,197, filed Feb. 2, 1998, which is incorporated by reference as if fully set forth herein, teaches a rolling containers assembly typically having its structural visual parts made of plastic.

Figure 60:
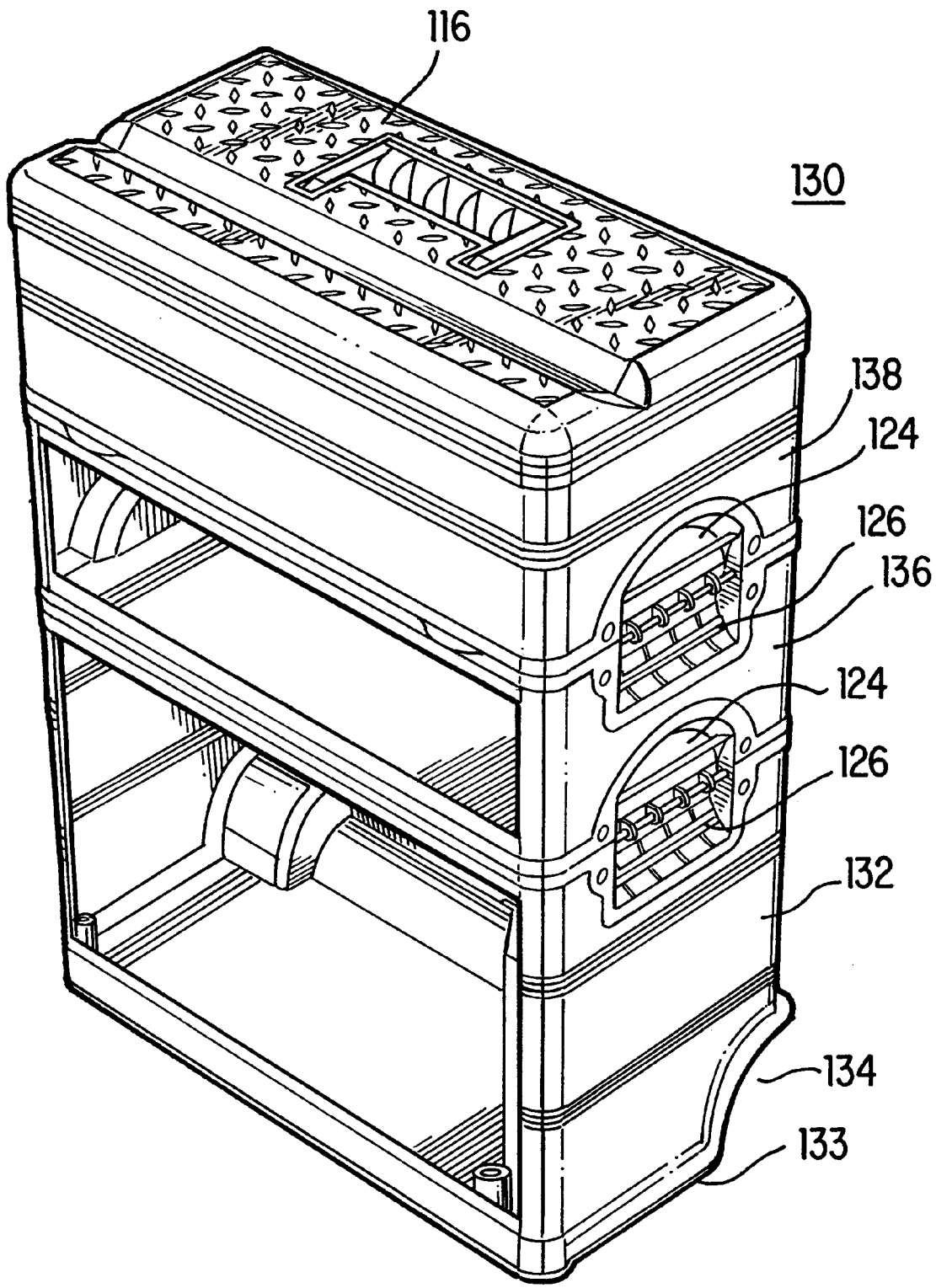
FIG. 60 shows a rolling containers assembly and accessories thereof manufactured according to the present invention.

FIG. 60 shows a similar, partially disassembled, rolling containers assembly 130, wherein horizontally deployed elements thereof are made of plastic, whereas vertically deployed elements thereof are made of metal, whereas, the plastic and metal elements are connected together as described hereinabove in accordance with the spirit of the present invention.

Assembly 130 includes a bottom container 132 for holding, for example a rotating bin, or a sliding drawer therein. Lower base element 133 of container 132 is formed with recessions 134 for accepting rear wheels. On top of bottom container 132 provided are a mid container 136 and a top container 138. Mid container 136 is similar in structure to the container presented in FIGS. 52–54, whereas top container 138 is similar in structure to the container presented in FIGS. 55–59, in that it includes an openable cover 116. Containers 132, 136 and 138 are engaged therebetween in a fashion already described with respect to FIGS. 52–54, i.e., via recessions 124 and locking mechanisms 126.

Further according to the present invention there is provided a method of engaging together in a stable, substantially non-separable, manner at least one plastic element and at least one metal element having a surface and an end portion.

The method is effected by implementing the following method steps, in which, in a first step, accepting groove(s) having opening(s) are formed in the plastic element(s).

In a second step of the method according to the present invention, at least one inner cut, preferably a plurality of substantially evenly spaced inner cuts, are performed in the end portion(s) of the metal element(s). Each of the inner cut(s) is designed so as to enable at least one piece remaining integrally connected to the metal element(s) to at least slightly protrude from the surface thereof. The piece(s) feature at least one sharp or pointed edge, generally pointing towards the opening of the accepting groove (when assembled), such that the end portion(s) of the metal element(s) are readily insertable into their respective accepting groove(s) of the plastic element(s).

In a third step of the method according to the present invention, the end portion(s) of the metal element(s) are inserted into the accepting groove(s) of the plastic element(s) via the opening(s), so as to enable the piece(s) to secure the end portion(s) in the accepting groove(s), so as to resist separation of the plastic element(s) and the metal element(s).

The present invention enjoys a major advantage over the prior art because the process of assembling articles manufactured in accordance with the spirit thereof, is much simpler, as it, in most cases, only involves inserting the end portion of a metal elements into a respective groove formed in an accepting plastic element, while securing of the pieces together is ensured via the structural features described herein.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An article of manufacture, comprising:
   at least one plastic element formed with an accepting groove having an opening; and
   at least one metal element having a surface and an end portion being intimately accepted in said accepting groove,
   wherein said end portion of said at least one metal element has at least one piece formed with at least one inner cut such that said one piece remains integrally connected to a main body portion of said metal element and at least slightly protrudes from said surface, said at least one piece featuring a double horn configuration having at least two protruding sharp or pointed ends generally pointing towards said opening of said accepting groove, and
   wherein said end portion of said at least one metal element is insertable into said accepting groove of said at least one plastic element, and said at least one piece secures said end portion in said accepting groove to resist separation of said at least one plastic element and said at least one metal element.

2. The article of manufacture of claim 1, wherein said at least one piece is U or V shaped.

3. The article of manufacture of claim 1, wherein said at least one piece is formed through a combination of said inner cut and a cutout.

4. The article of manufacture of claim 3, wherein said cutout is substantially circular having a first radius, and said inner cut is an incomplete circular form having a second radius larger than said first radius.

5. The article of manufacture of claim 1, wherein said at least one metal elements, alone or in combination with additional metal elements, form an enclosure selected from the group consisting of a substantially circular enclosure and a substantially circular enclosure.

6. The article of manufacture of claim 5, wherein said enclosure is selected from the group consisting of a single metal element bent to form said enclosure, and at least two metal elements bent to form said enclosure in combination.

7. The article of manufacture of claim 6, wherein said at least two metal elements bent to form said enclosure in combination feature complementary engaging mechanisms for stabilizing said combination.

8. The article of manufacture of claim 1, wherein said at least one metal element features ribs.

9. The article of manufacture of claim 1, wherein said end portion of said at least one metal element is bent.

10. The article of manufacture of claim 9, wherein said bent end portion is bent about 90 degrees.

11. The article of manufacture of claim 1, wherein said accepting groove of said at least one plastic element includes an undercut.

12. The article of manufacture of claim 1, wherein said at least one plastic element and said at least one metal element are further connected to one another by at least one nit.

13. The article of manufacture of claim 1, wherein said accepting groove of said at least one plastic elements is formed between walls of a cutout formed in said at least one plastic element an walls of an extra plastic piece inserted into said cutout and thereafter welded to said at least one plastic element.

14. The article of manufacture of claim 1, formed as a container having two bases made of plastic and four side walls made of metal.

15. The article of manufacture of claim 14, wherein each of said bases includes a crossing rib structure.

16. The article of manufacture of claim 14, wherein at least one of said bases is formed with an opening.

17. The article of manufacture of claim 14, wherein at least one of said bases is formed with a portion of a hinge mechanism for holding an openable cover having a compatible portion of said hinge mechanism.

18. The article of manufacture of claim 17, wherein said openable cover is decorated with direction alternating quatrogons, so as to mimic appearance of metal articles.

19. The article of manufacture of claim 17, wherein said container includes a wheel for rolling the container and a locking mechanism for attaching additional containers to said container.

20. The article of manufacture of claim 1, formed as a construct having two sides made of plastic and at least one metal member connected therebetween.

21. The article of manufacture of claim 20, wherein said construct is selected from the group consisting of a drawer, a door, a chair, a bin, a mail box, a ladder, a bench and a shelf.

22. A metal element, comprising:

a surface;

a first end portion; and a second end portion opposite the first end portion, wherein said first end portion has a plurality of pieces formed with a plurality of respective inner cuts such that said plurality of pieces each remain integrally connected to the metal element and at least slightly protrude from said surface, each of said plurality of pieces featuring a double horn configuration having at least two protruding sharp or pointed ends generally pointing towards said second end portion.

23. The metal element of claim 22, wherein said each of said plurality of pieces is U or V shaped.

24. The metal element of claim 22, wherein at least one piece of said plurality of pieces is formed through a combination of said inner cut and a cutout.

25. The metal element of claim 24, wherein said cutout is substantially circular having a first radius, and said inner cut is an incomplete circular form having a second radius larger than said first radius.

26. The metal element of claim 22, wherein said metal element features ribs.

27. The metal element of claim 22, wherein said end portion of said metal element is bent.

28. The metal element of claim 27, wherein said bent end portion is bent about 90 degrees.

29. A method of engaging together in a stable, substantially non-separable, manner at least one plastic element and at least one metal element having a surface and an end portion, the method comprising the steps of:

(a) forming an accepting groove having an opening in said at least one plastic element;

(b) forming at least one inner cut in a surface of said at least one plastic piece to form at least one piece that protrudes from the surface thereof and remains integrally connected to a main body portion of said metal element, said at least one piece featuring a double horn configuration having at least two protruding sharp or pointed ends generally pointing towards said opening of said accepting groove, and said end portion of said at least one metal element is insertable into said accepting groove of said at least one plastic element; and (c) inserting said end portion of said at least one metal element into said accepting groove of said at least one plastic element via said opening to secure said end portion in said accepting groove such that said at least one piece resists separation of said at least one plastic element and said at least one metal element.

30. The method of claim 29, wherein said at least one piece is U or V shaped.

31. The method of claim 29, wherein said at least one piece is formed through a combination of said inner cut and a cutout.

32. The method of claim 31, wherein said cutout is substantially circular having a first radius, and said inner cut is an incomplete circular form having a second radius larger than said first radius.

33. The method element of claim 29, wherein said at least one metal element ribs.

34. The method of claim 29, wherein said end portion of said at least one metal element is bent.

35. The of claim 34, wherein said bent end portion is bent about 90 degrees.

* * * * *